United States Patent [19]
Chamberlin

[11] 4,228,518
[45] Oct. 14, 1980

[54] MICROPROCESSOR HAVING MULTIPLY/DIVIDE CIRCUITRY

[75] Inventor: George P. Chamberlin, Tempe, Ariz.
[73] Assignee: Motorola, Inc., Schaumburg, Ill.
[21] Appl. No.: 945,736
[22] Filed: Sep. 25, 1978
[51] Int. Cl.² ............................................. G06F 7/54
[52] U.S. Cl. .................................................. 364/759
[58] Field of Search ............................... 364/759, 760

[56] References Cited

U.S. PATENT DOCUMENTS

| | | | |
|---|---|---|---|
| 4,065,666 | 12/1977 | Wu | 364/759 |
| 4,086,474 | 4/1978 | Negi et al. | 364/757 |

OTHER PUBLICATIONS

Hanf, "Multiply-Divide", *IBM Tech. Disclosure Bulletin*, vol. 11, No. 6, Nov. 1968, pp. 658-660.
Dauby et al., "Half-Wired Multiplier", *IBM Tech. Disclosure Bulletin*, vol. 18, No. 10, Mar. 1976, pp. 3311-3312.

Primary Examiner—David H. Malzahn
Attorney, Agent, or Firm—Joe E. Barbee

[57] ABSTRACT

A microprocessor having the capability of performing either a multiply or divide operation from a single instruction for each operation is provided. Much of the standard circuitry of a microprocessor is used along with a multiply/divide cycle counter, logic circuitry, and a shift network separate from the arithmetic logic unit. The microprocessor has the capability of performing unsigned integer multiplication and division. A shift and add algorithm is used for multiplication while for division a non-restoring divide algorithm is used.

8 Claims, 11 Drawing Figures

MICROPROCESSOR HAVING MULTIPLY/DIVIDE CIRCUITRY

A related patent application is my copending application Ser. No. 946,222 filed on the same day and assigned to the same assignee as the present application.

BACKGROUND OF THE INVENTION

This invention relates, in general, to microprocessors, and more particularly, to those microprocessors on a single integrated circuit chip having the capability of performing multiply and divide routines.

Digital computer systems have performed multiply and divide routines in the past, however, the implementation of multiply and divide instructions in the logic system of a computer is quite complex. In many of the smaller, lower cost computer systems, multiply and divide instructions are not provided. This leaves it up to the user to program subroutines to perform these operations if they are required. These subroutines can be rather lengthy.

Microprocessors are generally manufactured on a single integrated circuit chip and are accordingly rather small digital computer systems which do not commonly include a multiply or divide instruction in their list of instructions. If a user has a large enough memory, and time is not a factor, the user can program subroutines to perform the multiply and divide routines. In some cases, a user has added peripheral multiplier arrays to work in conjunction with a microprocessor chip to implement fast multiply instructions, however, this requires additional hardware and interconnections.

BRIEF SUMMARY OF THE INVENTION

By now it should be appreciated that it would be desirable to have a microprocessor with built in multiply and divide instructions which do not occupy a great amount of additional circuitry on a microprocessor chip and yet can accomplish a multiply or divide instruction in a relatively short time.

Among the several objects and advantageous effects of the present invention may be noted the provision of a single instruction for the microprocessor to perform a multiplication and a single instruction for the microprocessor to perform a division without having to add a great amount of additional circuitry to the microprocessor and yet accomplishing the multiplication or division in a timely manner.

In accomplishing the above desirable and other advantageous effects in one form, there is provided an improved microprocessor capable of performing multiply or divide instructions and requiring only a minimum amount of additional circuitry on the microprocessor. In performing a multiply or divide instruction, an arithmetic and logic unit, A register which is usually used in conjunction with the arithmetic and logic unit, and an M register which can be used by the microprocessor to contain the memory address for read or write memory instructions are all used. In addition, a shift network, which is separate from the arithmetic and logic unit, a multiply/divide cycle counter, and logic circuitry are used to accomplish the multiply or divide operation. One of the operands involved in a multiply or divide operation is stored in an addressable storage portion of the microprocessor.

In a divide operation, a dividend is contained in the A and M registers, with the most significant portion in the A register. The dividend is divided by the contents of the addressable storage register. The quotient is placed in the M register and the remainder is placed in the A register. For a multiply routine, the contents of the addressable storage register are multiplied by the contents of the M register and added to the contents of the A register and the most significant portion of the product is placed in the A register and the least significant portion of the product is placed in the M register.

DETAILED DESCRIPTION OF THE INVENTION

Figure 1:
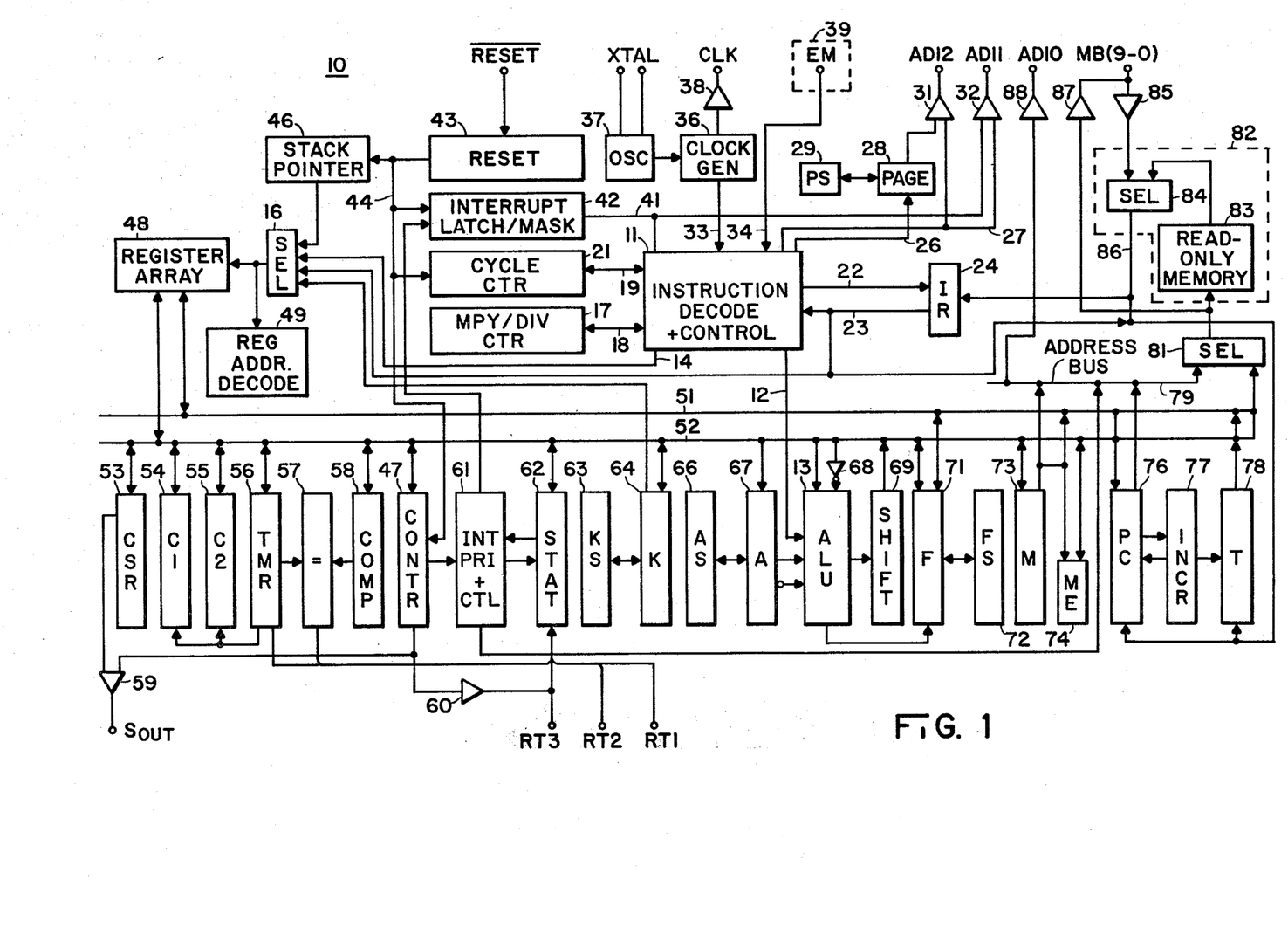
FIG. 1 is a block diagram of a microprocessor system having the capability of performing multiply or divide by a single instruction.

Illustrated in FIG. 1 is a block diagram of a microprocessor having the capability of performing a multiplication or division routine by a single instruction. Microprocessor 10 is fully disclosed in my copending patent application Ser. No. 946,222 filed on the same day as the present application and assigned to the same assignee. My copending patent application is hereby incorporated herein by reference. An explanation of the entire operation of microprocessor 10 is not necessary for an understanding of the multiply/divide function, however, a complete explanation of the operation of microprocessor 10 can be found in the hereinbefore mentioned copending patent application which has been incorporated herein by reference.

Figure 2:
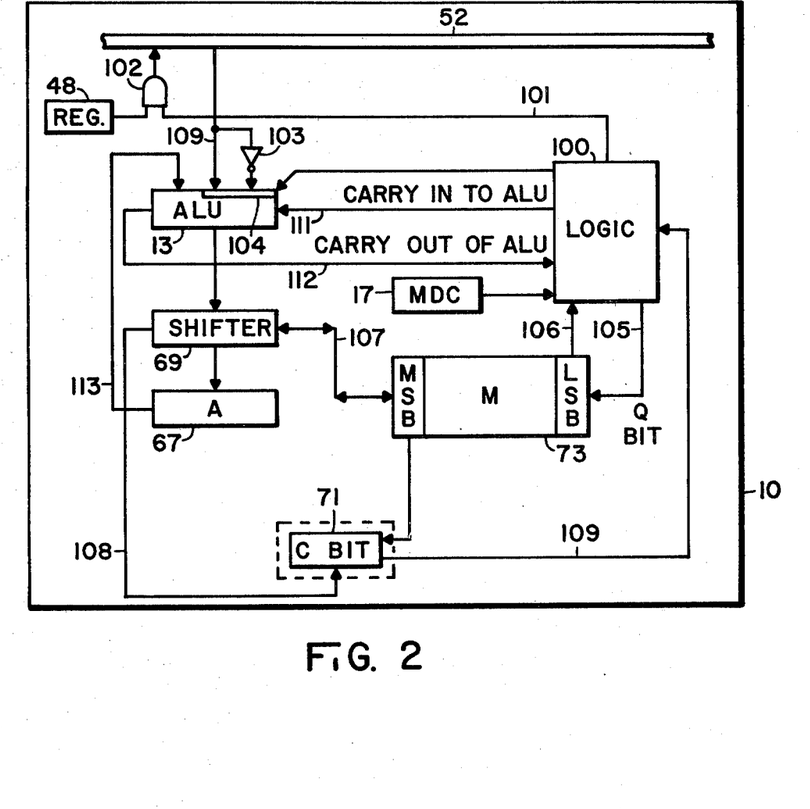
FIG. 2 is a block diagram of a portion of the microprocessor of FIG. 1 illustrating the portion of the microprocessor used for a multiply or divide.

FIG. 2 is a block diagram of the portions of microprocessor 10 which are used to accomplish a multiply or a divide operation. The portions of microprocessor 10 illustrated in FIG. 1 and FIG. 2 are identified by the same reference numerals.

In FIG. 2, register array 48 is coupled to data bus 52 by a logic gate illustrated as AND gate 102. Data bus 52 is coupled to arithmetic and logic unit 13 by conductor 109 and inverter 103. Conductor 109 or an output from inverter 103 is coupled into arithmetic and logic unit 13 by gating circuitry 104. Gating circuitry 104 is controlled by an output from logic circuitry 100. Logic circuitry 100 also provides a carry-in to arithmetic and logic unit 13 by way of conductor 11. Arithmetic and logic unit (ALU) 13 provides a carryout on conductor 112 to logic circuitry 100. Data out of arithmetic and logic unit 13 is coupled to shift network 69, and shift network 69 has the capability of shifting data right, shifting data left, or not shifting at all. The most significant bit of data input to shift network 69 can be coupled during a shift-left operation by conductor 108 to the C bit position of flag register 71. Data output from shifter 69 is coupled to A register 67. The contents in A register 67 can be coupled by conductor 113 to arithmetic and logic unit 13. M register 73 is coupled by conductor 107 to shift network 69. The most significant bit from M register 73 can be shifted into the C bit position of F register 71 during a shift-left operation, and the least significant bit of M register 73 is coupled to logic circuitry 100 by conductor 106. Logic circuitry 100 can provide a data bit on conductor 105 to be shifted into the least significant bit position of M register 73. The C bit data can be coupled by conductor 109 to logic circuitry 100. Multiply or divide cycle counter 17 also provides an output which is coupled to logic circuitry 100.

One register in register array 48 serves as a storage means for holding an operand during the multiply or divide operation. In a multiplication routine, register array 48 contains the multiplicand while in a divide routine register array 48 contains the divisor. Register 67 and register 73 preferably hold the same number of bits as can a register or storage means in register array 48. In a divide routine register 67 and 73 can be used to hold a dividend wherein the most significant portion is located in register 67 and the least significant portion is located in register 73, thereby providing a dividend with twice as many bits as the divisor. At the completion of the divide routine, A register 67 will contain the remainder while M register 73 will contain the quotient. For a multiplication routine M register 73 contains the multiplier and will end up with the least significant portion of the product while A register 67 will end up with the most significant portion of the product thereby providing a product with twice as many bits as the multiplier or multiplicand. Microprocessor 10 performs unsigned integer multiplication or division. This means that all operands are represented as positive members so that the data is an absolute value. Preferably A register 67 and M register 73 are 8 bit registers, however, it will be appreciated that other than 8 bit registers could be used and still benefit from the present invention.

A multiply routine starts off with the multiplier in register 73 and the multiplicand in a register of register array 48. If the least significant bit in register 73 is a logic "1" then the multiplicand is transferred to arithmetic and logic unit 13 where it is added to the contents of A register 67 and the result is shifted right one place. The bit shifted out of shift network 69 is coupled by conductor 107 into register 73. If the least significant bit in register 73 is a logic "0" then zero is added to the contents in register 67 and the result is shifted right one place. In each clock cycle of microprocessor 10, the multiplicand is selected, however, if the least significant bit of register 73 is a logic "0", then arithmetic and logic unit 13 is forced to add zero to the contents of register 67.

Multiply/divide counter (MDC) 17 is a shifting type counter which always starts counting from a count of zero. Counter 17 counts from zero to seven clock cycles for a multiply routine and counts from zero to nine clock cycles for a divide routine. Counter 17 always starts at a count of zero and returns to zero when it reaches its highest count. Since counter 17 is free running until it reaches the count of zero, it will count up to zero if it is not already at zero when power is first applied to microprocessor 10. Counter 17 will remain at a zero state until a multiply or divide op code is recognized by microprocessor 10. When microprocessor 10 is first initialized, the reset input into microprocessor 10 is preferably held low for at least 10 clock cyles to guarantee that multiply/divide counter 17 has reached a zero count.

Prior to transferring the multiplicand to ALU 13, data bus 52 is precharged to all logic level "1's". During a multiplication routine if the least significant bit in M register 73 is a logic "0", then an initial carry is set on conductor 111, and in effect what happens is that the contents of register 67 are added to all logic "1's" plus an initial carry which is equivalent to adding the contents of register 67 to all logic "0's". The addition occurs in arithmetic and logic unit 13. If the least significant bit of M register 73 is a logic "1", the multiplicand contained in register array 48 is transferred to data bus 52. Also on the last cycle, which is the eighth cycle of a multiply routine, the contents on memory bus 86, of FIG. 1, are transferred to instruction register 24. During the first seven clock cycles loading of instruction register 24 is inhibited so that the same op code remains in instruction register 24, and incrementing of P counter 76 is also inhibited. On the eighth clock cycle, P counter 76 is allowed to increment and a new instruction is allowed to enter instruction register 24. Inhibiting P counter 76 permits the same address to appear on address bus 79 from program counter 76 during multiplication or division.

Microprocessor 10 accomplishes multiplication by adding and shifting. Division is accomplished by adding or subtracting the divisor in register array 48 from the contents in register 67 depending upon whether the previous quotient was a "0" or a "1" respectively. A non-restoring divide algorithm is used. To find a quotient, the divisor is initially subtracted from the dividend. If the answer is negative, then half of the divisor is added to the answer. If the answer is still negative then one-fourth of the divisor is added to the second answer obtained. If the third answer obtained is now positive then one-eighth of the divisor is subtracted from the third answer. Division continues in this manner for the desired number of cycles, which for microprocessor 10 would be nine cycles since microprocessor 10 is an 8-bit machine. To obtain half of a binary number, all that is necessary is to shift the binary number to the right one position. However, in the present implementation of the divide routine, instead of shifting the divisor right one position, the dividend is shifted left one position. Another binary shortcut that is used in the divide routine is to add the ones complement of the divisor to the dividend and to add a carry-in amounts to the same thing as subtracting the divisor from the dividend.

On the ninth cycle of a division operation, the bit appearing in the most significant bit position of M register 73 is shifted into the C bit position of register 71. During a divide, the divisor in register array 48 is added to or subtracted from the contents of register 67 by the arithmetic and logic unit 13 depending upon whether the previous quotient was a zero or a one which would correspond to the previous ALU result being negative or positive, respectively. If the divisor is greater than the contents in register 67, the result of the initial subtraction would be negative, and on the next clock cycle half of the divisor is added back in. Logic circuitry 100 determines what the quotient or Q bit is. Any time the answer is positive, the Q bit will be "one" "1" and any time the answer is negative, the Q bit will be a "zero". However, on the first cycle the Q bit will be a "zero" unless an overflow condition has occurred. When the first Q bit is a "1", the quotient obtained will be invalid. On the ninth clock cycle, the most significant bit in register 73 is shifted to the C bit position in register 71, and this most significant bit is the same as the first Q bit that was coupled from logic circuit 100 by conductor 105 to the least significant bit position of register 73 and serves as an indication to the software that an invalid answer has been obtained. It will be noted that if the Q bit had been checked after the first cycle and found to be a one, the divide routine could have been aborted at that time, however, by waiting until after the ninth cycle has occurred, a considerable amount of circuitry is saved. The tenth clock cycle in a divide routine is used to restore the remainder since previous cycles could have left the remainder as a negative remainder and in order for the software to use the remainder, it must be restored to a positive number. This is accomplished by adding the divisor to the contents of register 67 if the contents of register 67 are negative. During this tenth cycle, the divisor and the contents of register A are not shifted. The contents of register 67 are not shifted on the ninth clock cycle either while the contents of register 73 are, hence, the contents of register 67 are shifted only eight times while the contents of register 73 are shifted nine times during a divide routine.

In summary, the first cycle of a divide routine is a special case to force a subtract while for cycles two through nine, whether an add or subtract is performed is determined by the least significant bit of register 73. Then on the ninth cycle, the contents of register 67 are not shifted but the contents of register 73 are shifted, and on the tenth cycle the divisor in register array 48 is added to the contents of register 67 if the least significant bit of register 73 is a "zero". If the least significant bit of register 73 is a "one" then the contents of register 67 are not changed; the add operation is still performed but the sum is not transferred into register 67.

During a divide routine, counter 17 counts modulo 10 while during a multiply routine counter 17 counts modulo 8.

Cycle counter 21 illustrated in FIG. 1 provides an interrupt inhibit signal until the last cycle of a multiply or divide routine is accomplished.

When microprocessor 10 receives a multiply or divide op code, the op code is decoded and is used to inhibit incrementor 77 so that program counter 76 is not incremented, however, program counter 76 still gets transferred to incrementor 77 and back again each clock cycle, but its contents are not increased. Program counter 76 is a dynamic register and continues to output the next address since it was incremented prior to the multiply or divide instruction being recognized, however, instruction register 24 is inhibited until the last cycle of a divide or multiply routine.

Multiply/divide counter 17 is used to recognize the last cycle of a multiply or divide routine, and in addition, recognizes a first and ninth cycle of a divide routine and provides outputs for these cycles.

An example of a divide routine as performed by microprocessor 10 will be set out hereinbelow since the routine is somewhat more complex than a multiply routine. For purposes of this example only, a four bit number is used to illustrate the operation of microprocessor 10 although it will be understood that the same operation is followed for a number having a larger bit length. In keeping with the example it will be assumed that registers 67 and 73 are four bit registers and that the operand in register array 48 is a four bit number. For the example, 34 (00100010) is divided by 6 (0110); the ones complement of the divisor 6 is 1001. When the ones complement is used, an extra "one" is also added via the carry-in conductor 111. The numeral 34 will appear in A register 67 and M register 73 with the most significant portion in A register 67. The divisor of course will be in a register R in register array 48.

|     |           | Q Bit |
|-----|-----------|-------|
| A,M | 0010 0010 |       |
| R   | 1001      |       |
| CI  | 1         |       |
| ALU | 1100      |       |
| CO  | 0         |       |
|     |           | 0     |
| CB  | 1         |       |
| A,M | 1000 0100 |       |
| R   | 0110      |       |
| CI  | 0         |       |
| ALU | 1110      |       |
| CO  | 0         |       |
|     |           | 0     |
| CB  | 1         |       |
| A,M | 1100 1000 |       |
| R   | 0110      |       |
| CI  | 0         |       |
| ALU | 0010      |       |
| CO  | 1         |       |
|     |           | 1     |
| CB  | 0         |       |
| A,M | 0101 0001 |       |
| R   | 1001      |       |
| CI  | 1         |       |
| ALU | 1111      |       |
| CO  | 0         |       |
|     |           | 0     |
| CB  | 1         |       |
| A,M | 1110 0010 |       |
| R   | 0110      |       |
| CI  | 0         |       |
| ALU | 0100      |       |
| CO  | 1         |       |
|     |           | 1     |
| CB  | 0         |       |
| A,M | 0100 0101 |       |

The carryout (CO) is the carry bit from the ALU and is coupled by conductor 112 to logic circuitry 100. The carry out (CO) from arithmetic and logic unit 13 is a "0" if no carry results from the addition performed by the arithmetic and logic unit or is a "1" if a carry is generated by the arithmetic and logic unit. The carry-in (CI) is generated by logic circuitry 100 and is coupled to the arithmetic and logic unit 13 by conductor 111. CB is the bit shifted out of shift network 69 and latched by the C bit position of register 71. Since the bit in the C bit latch is a zero, an overflow did not occur and accordingly the quotient is a valid quotient.

In the example set forth above, five add and shift cycles have been shown. During the first four cycles, the most significant bit of M register 73 is shifted into the least significant position of A register 67 by way of shift network 69, and the most significant output from shift network 69 is shifted into the C bit latch. During the first five cycles, the Q bit is shifted into the least significant position of M register 73. During the fifth cycle, the logic "1" Q bit is shifted into the least significant position of the M register, while the most significant bit of the M register is shifted into the C bit latch rather than being shifted into the least significant position of the A register. The result of the ALU operation is loaded directly into the A register on the fifth cycle without being shifted by shift network 69. During the sixth cycle (not shown) the divisor R is added to the contents of the A register within ALU 13, and the ALU result if passed through shift network 69 without being shifted. Since the final (least significant) Q bit, now stored in the least significant position of the M register, is a logic "1", the remainder stored in the A register is positive and need not be corrected during the sixth cycle. If the final Q bit had been a logic "0", then the output of shift network 69 would be loaded into A register 67 to restore the remainder to a positive number.

The logic equation used to determine the Q bit during the first five add-shift cycles is $$Q \text{ bit} = [\overline{L1} \cdot \overline{(CB \oplus M_o)}] \oplus CO$$

Where
$\overline{L1}$ is generated by cycle counter 21 (in FIG. 1) and is "0" during the first clock cycle and is "1" during the remaining clock cycles;
CB is the output of the C bit latch;
$M_o$ is the least significant bit of the M register 73; and
CO is the carry out from ALU 13.

The quantity $(\overline{CB \oplus M_o})$ is latched during the T3 time period of each clock cycle since CB and $M_o$ are altered when M register 73 is shifted once the Q bit has been determined. Latching this quantity during T3 prevents a race around condition from occurring after the M register is shifted.

In the example above, $\overline{L1}$ is "0" during the first clock cycle, and therefore the first Q bit (the overflow indication bit) is merely equal to the ALU carry-out CO, or "0". During the second clock cycle, $\overline{L1}$ is "1", CB is "1" since the C bit latch stored a "1" during the first cycle, $M_o$ is "0", and CO is "0", so the next Q bit is equal to $[1 \cdot \overline{(1 \oplus 0)}] \oplus 0$, or "0". The third, fourth, and fifth Q bits are determined in a similar manner.

The quotient from the above division is in M register 73 and is five (0101) while the remainder is in A register 67 and is four (0100).

Figure 3:
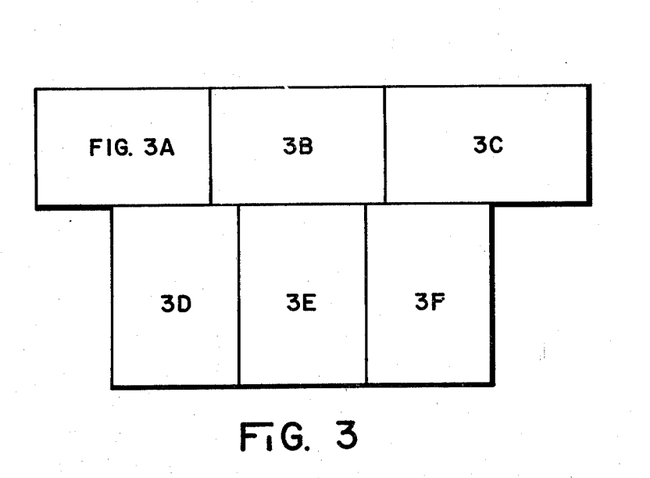
FIG. 3 illustrates the arrangement of FIGS. 3A through 3F which illustrate the logic diagram of the portion of the microprocessor system used for multiplying or dividing.
Figure 3A:
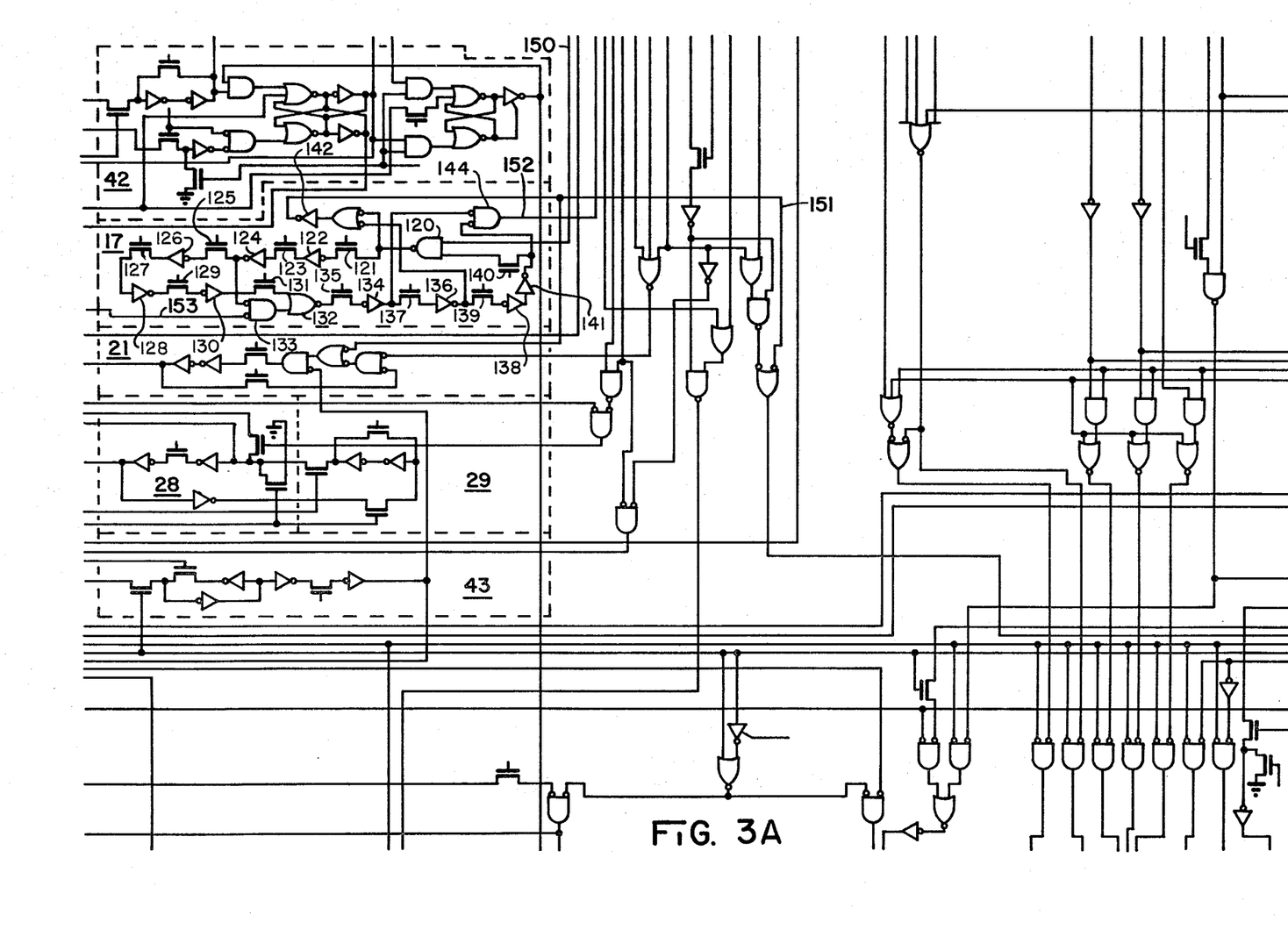
Figure 3B:
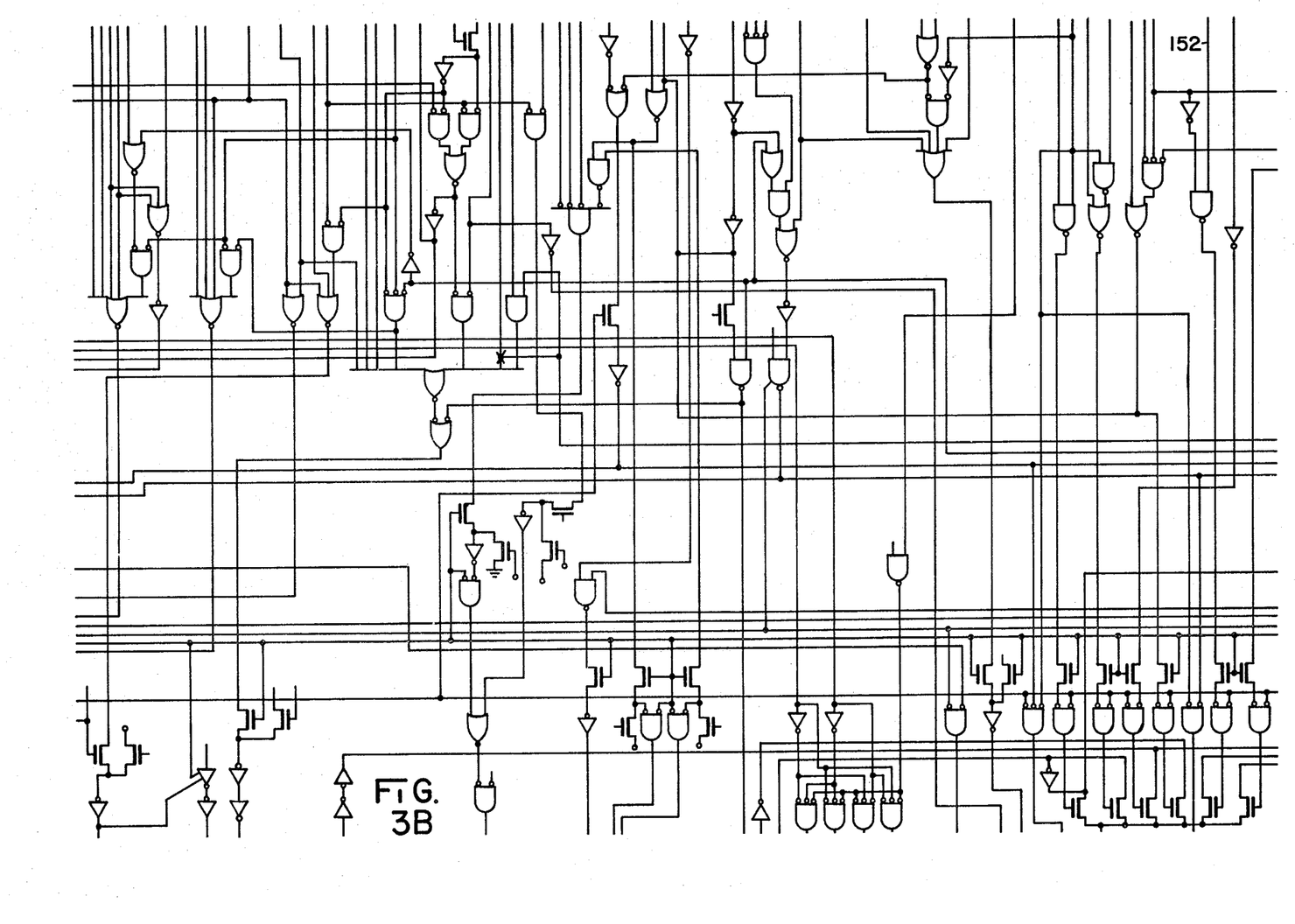
Figure 3C:
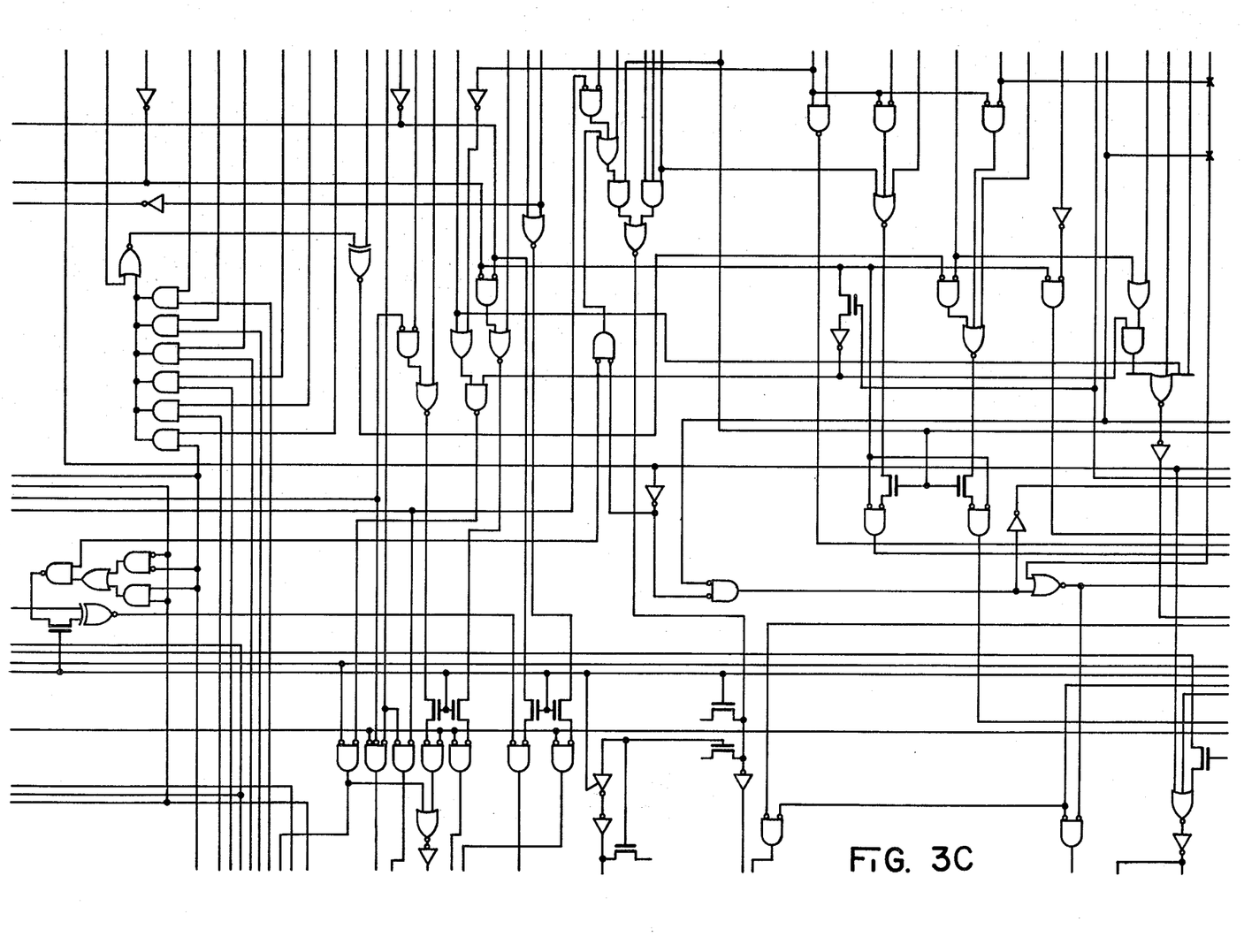
Figure 3D:
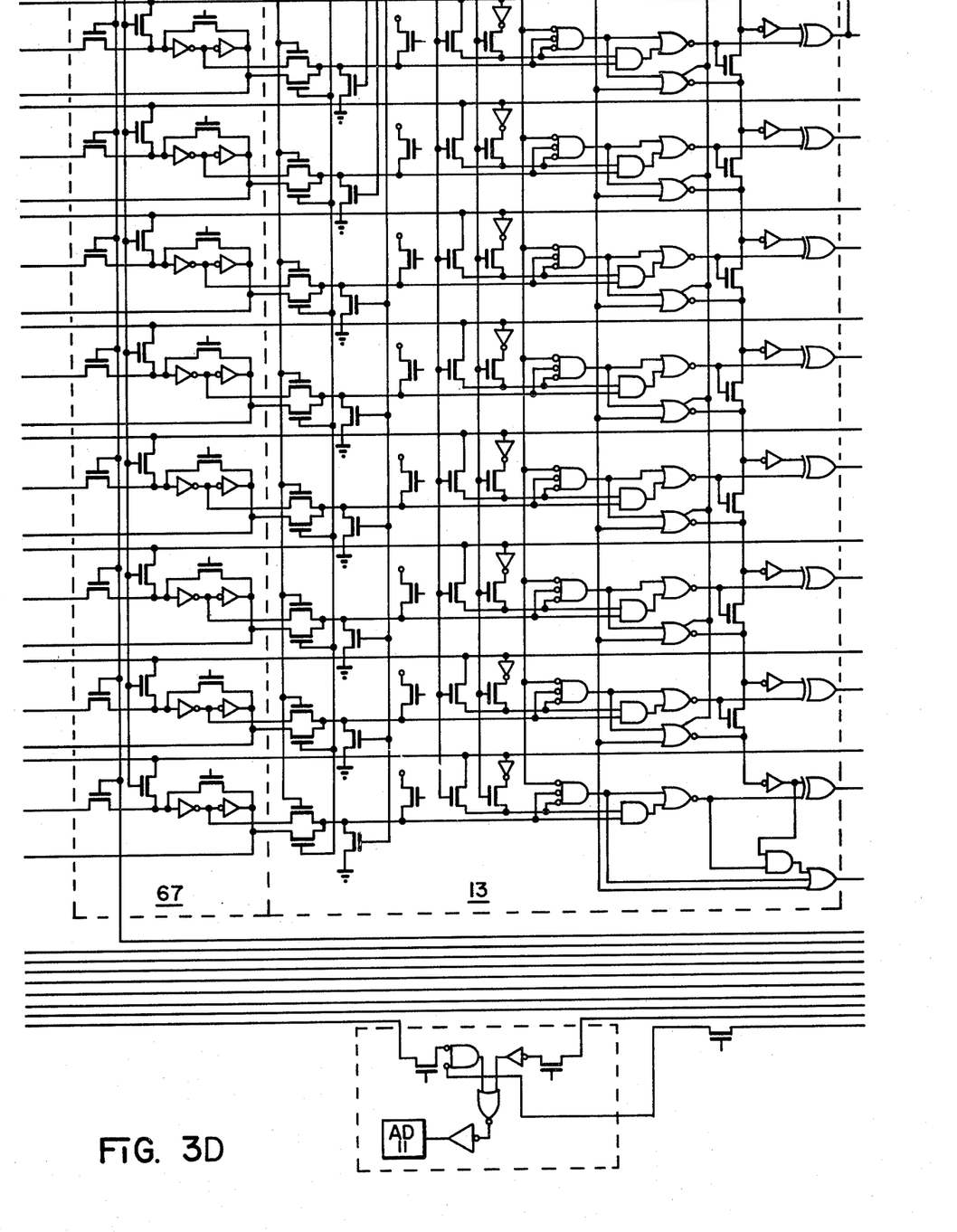
Figure 3E:
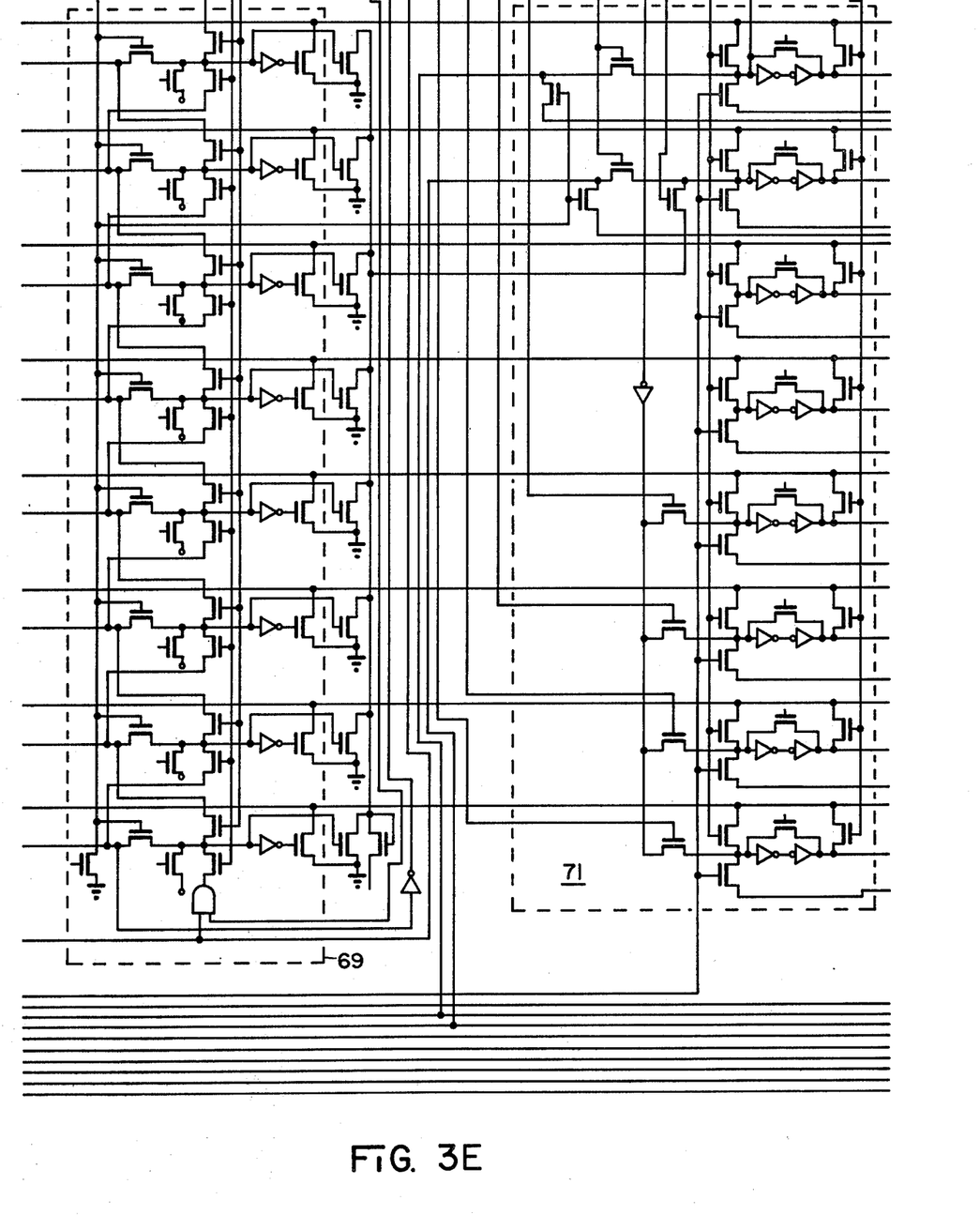
Figure 3F:
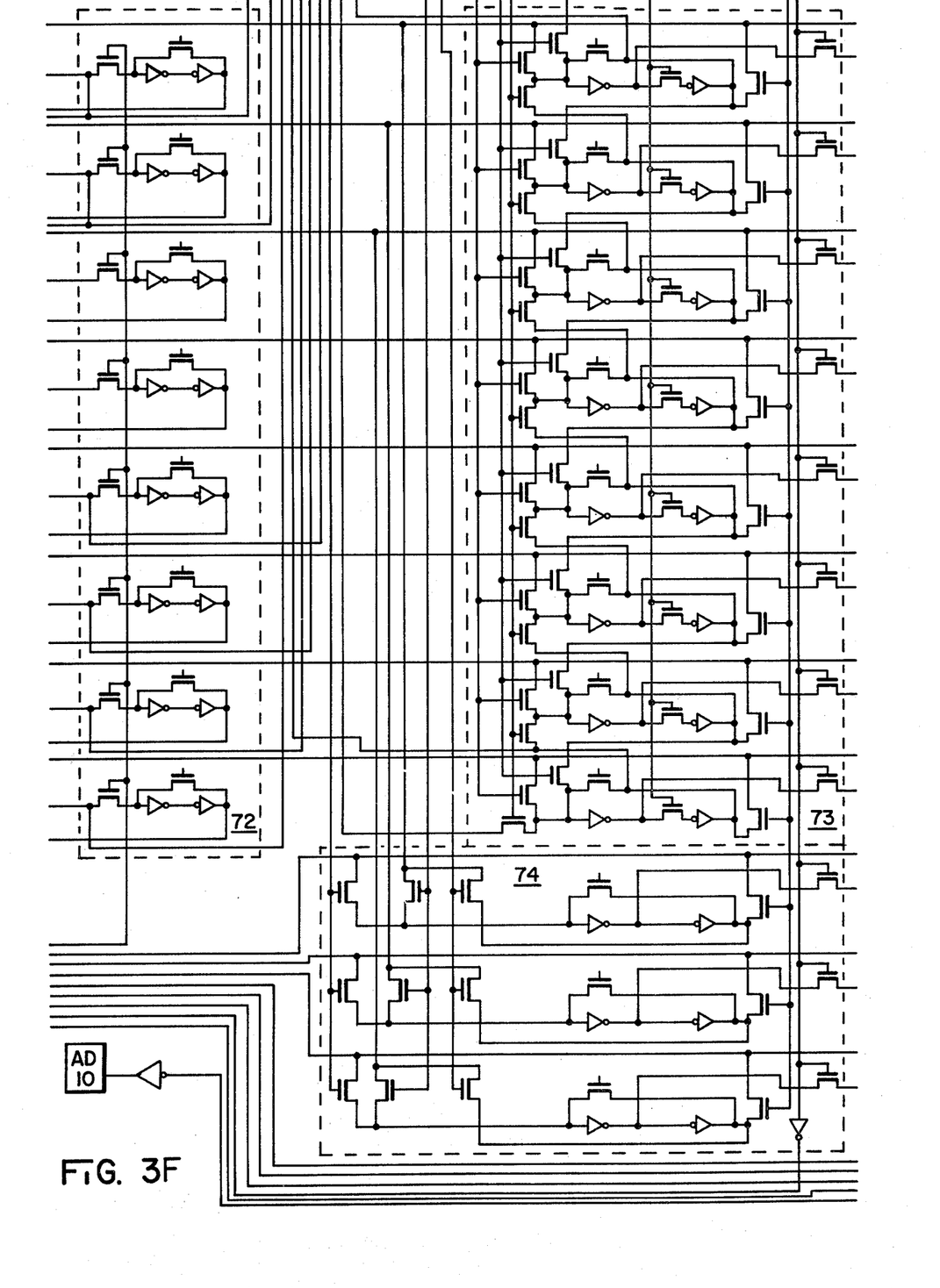

FIG. 3 illustrates the arrangement of FIGS. 3A-3F by laying the drawing sheets adjacent to one another. FIGS. 3A through 3F illustrate a logic diagram of a portion of microprocessor 10. Some of logic circuitry 100 and all of multiply/divide counter 17 are illustrated in FIG. 3A. The complete logic diagram of microprocessor 10 is shown in the hereinbefore mentioned copending patent application. FIGS. 3A-3F are extracted from the copending patent application to show the logic diagram of the portions of microprocessor 10 used for the multiply or divide routines.

Figure 4:
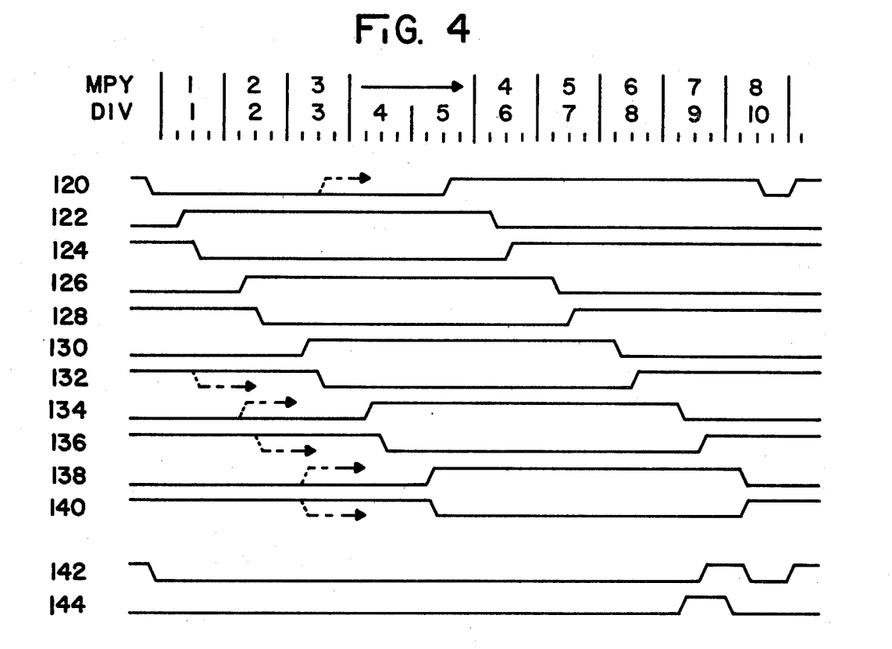
FIG. 4 is a timing chart illustrating signals of a multiply/divide counter using the microprocessor.
Figure 5:
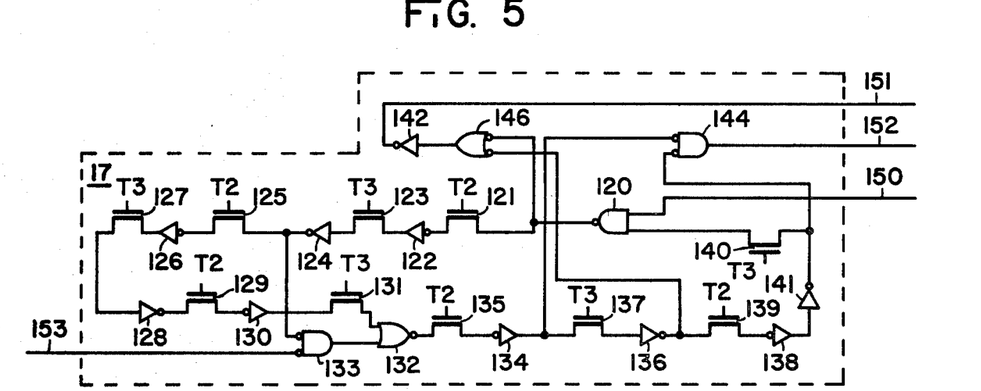
FIG. 5 is an enlarged view of the logic diagram of the multiply/divide counter.

Counter 17 is illustrated in a larger view in FIG. 5. Counter 17 receives a multiply/divide command on line 150 which serves to activate counter 17. Line 150 serves as an input to a logic gate 120 illustrated as a NAND gate. The operation of counter 17 can perhaps be more easily understood by the use of the timing diagram shown in FIG. 4. Across the top of the diagram are the cycle numbers for a multiply routine and for a divide routine. Along the left hand side of the chart, the different logic gate numbers of counter 17 are shown, and adjacent to each logic gate number and to its right is the timing signal output of each respective logic gate. The dashed lines indicate changes to the timing signals for multiply routines. Each clock cycle of microprocessor 10 is divided up into four portions which are generally numbered T1, T2, T3, T4. A multiply routine is accomplished in eight clock cycles while a divide routine is accomplished in ten clock cycles. Cycles 3 and 4 of the multiply routine are shown separated by an arrow in order to accommodate the two extra cycles for the divide routine, however, in interpreting the chart, it is to be assumed that cycles 3 and 4 are juxtaposed and the timing signals below them are condensed accordingly. Counter 17 produces an output on line 151 upon receipt of the input command on line 150. The output on line 151 serves to inhibit incrementor 77 which is illustrated in FIG. 1. Counter 17 also produces an output on line 152 which is used in logic circuitry 100 which is partly illustrated in FIG. 3B.

Upon receipt of a logic "1" input on line 150, the output of logic gate 120 goes low. The output of logic gate 120 is coupled to inverter 122 by field effect transistor (FET) 121. FET 121 is gated on by the T2 portion of each clock cycle. The output of inverter 122 is coupled by FET 123 to inverter 124. FET 123 is gated on by the T3 portion of each clock cycle. Accordingly, the output of logic gate 120 will be coupled to inverter 124 during the first clock cycle on the occurrence of the T2 and T3 portions. The output of inverter 124 is coupled to inverter 126 by FET 125 which is gated on by the T2 portion of each clock cycle. The output of inverter 126 is coupled to inverter 128 by FET 127 which is gated on by the T3 portion of each clock cycle. The output of inverter 128 is coupled to inverter 130 by FET 129 which is gated on or enabled by the T2 portion of each clock cycle. The output of inverter 130 is coupled to an input of NOR gate 132 by FET 131 which is gated on or made conductive by the T3 portion of each clock cycle. A second input of NOR gate 132 is supplied by an output of logic gate 133. Logic gate 133 is an AND gate having complemented inputs which produces a logic "1" level when both of its inputs are logic "0" levels. For a multiply routine the input to logic gate 133, on line 153, is a logic level "0". Therefore when the output of inverter 124 also becomes a "0" level, logic gate 133 will produce a logic "1" output thereby causing the output of logic gate 132 to go to a low level. As shown in FIG. 4, this occurs during the first clock cycle for a multiply routine. During a divide routine the input on line 153 is a logic high or logic level "1" which serves to inhibit logic gate 133 from producing a logic "1" output. In this manner counter 17 can be made to be a modulo 8 or a modulo 10 counter. When a low level on line 153 appears on the input of logic gate 133, for a multiply routine, then the output of inverter 124 is coupled to the output of NOR gate 132 thereby bypassing inverters 126, 128, and 130 thereby shortening counter 17 counting cycle by two clock cycles. To go from the output of inverter 124 to the input of logic gate 132 by way of inverters 126, 128, and 130 requires two clock cycles since FET 125 is enabled by T2 time and the output of inverter 126 is not coupled to the input of inverter 128 until T3 time of the same clock cycle; therefore in the next clock cycle, the T2 time period couples the output of inverter 128 to the input of inverter 130. The output of logic gate 132 is coupled by field effect transistor 135, which is enabled by the T2 time portion, to inverter 134. The output of inverter 134 is coupled by FET 137, which is enabled by T3, to inverter 136. The output of inverter 136 is coupled to inverter 138 by FET 139 which is enabled by the T2 time portion. The output of inverter 138 is inverted by inverter 141 and coupled to logic gate 144 and back to logic gate 120 by field effect transistor 140 which is enabled by the T3 time portion of the clock cycle. This completes one loop around counter 17; however as will be understood by those skilled in the art, counter 17 does not go back to a zero count until the second loop around counter 17. The output of logic gate 142 appears on line 151 while the output of logic gate 144 appears on line 152. The output of inverter 134 is also coupled to an input of logic gate 144. Logic gate 146 receives inputs from inverter 136 and logic gate 120. The output of logic gate 146 is coupled to output inverter 142.

By now it should be appreciated that there has been provided a microprocessor having the capability of executing a multiply or divide instruction in a minimum amount of time and requiring only a minimum amount of additional circuitry to the microprocessor. Although the multiply/divide modifications, which have been shown, apply to microprocessor 10 it will be understood that these same changes could be applied to other microprocessors.

What is claimed is:

1. A microprocessor having circuitry for multiplying or dividing, comprising: an arithmetic and logic unit; a first register for holding a multiplier and for holding a least significant portion of a binary number to be divided and for containing a quotient upon completion of a division; a second register for holding a most significant portion of a product obtained from a multiplication routine and for holding the most significant portion of the binary number to be divided and for storing a remainder obtained from a divide routine, the second register being coupled to the arithmetic and logic unit; a shift network coupled to the arithmetic and logic unit and coupled to the first and second registers for shifting data outputted by the arithmetic and logic unit; logic circuitry coupled to the arithmetic and logic unit and to the first register for controlling the multiplying and dividing; and a counter coupled to the logic circuitry for counting microprocessor clock cycles elapsed during multiplication and during division.

2. The microprocessor of claim 1 wherein the counter is a shifting type counter.

3. The microprocessor of claim 2 wherein the shifting type counter includes a first logic gate having a first and a second input and an output, the first input being for receiving a multiply and for receiving a divide command; a first inverter; a first field effect transistor (FET) controlled by a first timing signal for coupling the output of the first logic gate to the first inverter; a second inverter; a second FET controlled by a second timing signal for coupling the first inverter to the second inverter; a third inverter; a third FET controlled by the first timing signal for coupling the second inverter to the third inverter; a fourth inverter; a fourth FET controlled by the second timing signal for coupling the third inverter to the fourth inverter; a fifth inverter; a fifth FET controlled by the first timing signal for coupling the fourth inverter to the fifth inverter; a second logic gate having a first and a second input and an output; a sixth FET controlled by the second timing signal for coupling the fifth inverter to the first input of the second logic gate; a third logic gate having a first and a second input and an output, the output being coupled to the second input of the second logic gate, the first input of the third logic gate being coupled to the second inverter, the second input of the third logic gate being coupled to a control signal to allow the shifting type counter to count up to a first or a second number; a sixth inverter; a seventh FET controlled by the first timing signal for coupling the output of the second logic gate to the sixth inverter; a seventh inverter; an eighth FET controlled by the second timing signal for coupling the sixth inverter to the seventh inverter; an eighth inverter; a ninth FET controlled by the first timing signal for coupling the seventh inverter to the eighth inverter; a tenth FET controlled by the second timing signal and being coupled to the second input of the first logic gate; a ninth inverter coupling the eighth inverter to the tenth FET; and a fourth logic gate having a first and a second input and providing an output for the counter, the first input being coupled to the ninth inverter, the second input of the fourth logic gate being coupled to the sixth inverter.

4. The microprocessor of claim 1 wherein the first register has a most significant bit which is monitored after a division to determine whether an overflow occurred.

5. The microprocessor of claim 1 wherein the shift network and the first register shift right during multiplication while during division the shift network and the first register shift left.

6. A microprocessor with multiply or divide capability and having storage means for storing the multiplicand for a multiplication routine and for storing the divisor for a division routine, an arithmetic and logic unit, and a data bus for transferring data from the storage means during multiplication and division, comprising: first means coupled to the arithmetic and logic unit for shifting data from the arithmetic and logic unit, the first means providing an output; a first register coupled to the arithmetic and logic unit and to the first means for receiving the output of the first means; a second register for storing a plurality of bits and being coupled to the first means and having a least significant bit; second means for providing logic control functions during multiply and during divide and being coupled to the arithmetic and logic unit and to the second register; and a cycle counter to count cycles of a multiply and of a divide and being coupled to the second means to provide an indication of the last cycle of a multiply and of a divide.

7. The microprocessor of claim 6 wherein the least significant bit of the second register is coupled to the second means to provide control during divide and a most significant bit of the second register is used after division as an indication of a valid quotient being obtained.

8. The microprocessor of claim 7 wherein the first register contains the most significant portion of a dividend during a division routine and contains the most significant portion of a product during a multiplication routine, and the second register contains the least significant portion of the dividend during a division routine and contains the multiplier during a multiplication routine, and contains the least significant portion of the product at completion of the multiplication routine.

* * * * *